G. W. MacKINNON.
AUTOMATIC AIR CUSHION.
APPLICATION FILED NOV. 5, 1917.
1,281,041.
Patented Oct. 8, 1918.
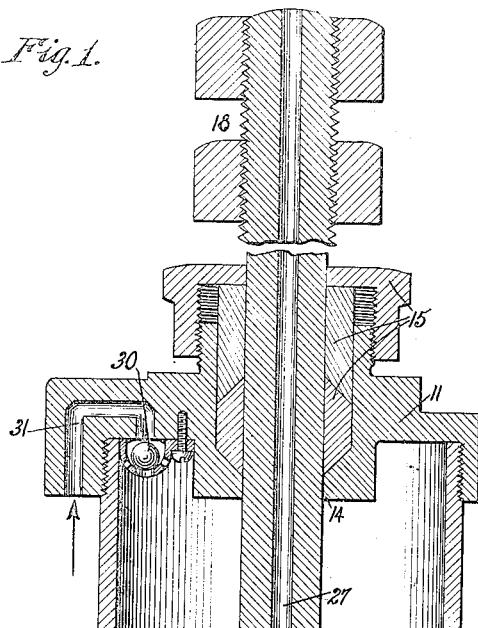
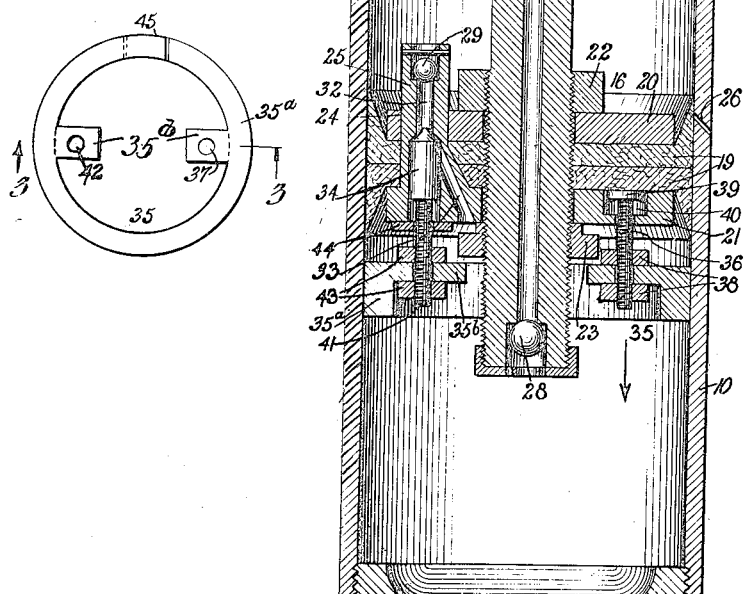
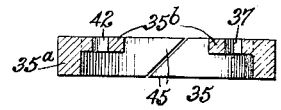
WITNESSES
INVENTOR
G. W. MacKinnon
BY 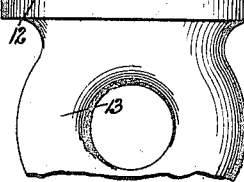
ATTORNEYS ical embodiment thereof reference is had to the accompanying drawings, in which like reference characters designate the same parts in the several views, and in which

UNITED STATES PATENT OFFICE.

GEORGE WILLIAM MacKINNON, OF BOSTON, MASSACHUSETTS.

AUTOMATIC AIR-CUSHION.

1,281,041.   Specification of Letters Patent.   Patented Oct. 8, 1918.

Application filed November 5, 1917. Serial No. 200,425.

*To all whom it may concern:*

Be it known that I, GEORGE W. MACKINNON, a citizen of the United States, and a resident of Boston, in the county of Suffolk and State of Massachusetts, have invented a new and Improved Automatic Air-Cushion, of which the following is a full, clear, and exact description.

This invention relates to air cushioning devices designed for use on automobiles or other devices where one purpose is to avoid shock or recoil incident to the operation of the springs. As is well known when a spring supported vehicle is operated over a gutter or obstacle, the springs are put under compression more or less violently, but the greatest danger in the breaking of springs and the maximum discomfort or danger to the occupants of the vehicle result from the recoil or upward throw of the springs as a result of the compression imparted thereto.

Among the primary objects of this invention, therefore, is to provide a means whereby the action and the recoil of the springs is cushioned pneumatically by automatic devices associated with the springs.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which Figure 1 is a vertical longitudinal section showing the main portions of my improvement approximately in neutral position, but moving downwardly with respect to the casing.

Fig. 2 is a plan view of a friction ring constituting a valve actuator; and

Fig. 3 is a transverse sectional detail on the line 3—3 of Fig. 2.

Referring now more particularly to the drawings for a full explanation of the construction and its functions it will be noted that my improvement comprises a tubular casing 10 preferably of hollow cylindrical form having a cap 11 secured to its upper end and a plug 12 closing the lower end thereof. The plug 12 carries or includes a strong eye structure 13 for attachment of the device at its lower end to any desired support. The cap 11 has a central hole 14 adapted to be sealed by means of a packing gland 15 of well known construction.

The other main portion of the improvement comprises a piston indicated as a whole at 16 and including a plunger or piston rod 17 fitted slidably through the hole 14 and packing gland 15 and having at its upper end an attachment clip 18. The piston head or piston proper is composed of a pair of leather or similar flexible washers 19 having a close airtight slidable fit within the cylinder 10 and locked in place with respect to the plunger 17 by means of a pair of interlocking washers or plates 20 and 21 arranged above and below the leather washers respectively and held in place by means of lock nuts 22 and 23 having threaded engagement with the plunger. The plate 20 at one side of the plunger has a vertical hole 24 through which projects a rigid valve stem 25 from the lower plate 21, said stem projecting also through the leather washers.

The casing or cylinder 10 is provided at one side and about midway of its ends with a port 26 through which excess air is adapted to flow from within the cylinder either above or below the piston in the practice of the device. The plunger 17 is provided with a central duct or bore 27 leading preferably all the way from the clip 18 through the lower end of the plunger where there is arranged a ball check valve 28 adapted to close automatically on the downward thrust of the piston whereby the air trapped below the piston is prevented from passing out through the duct 27. When, however, the piston is making an upstroke air will be admitted freely within the casing below the piston. In the upper end of the valve stem 25 is located a ball check valve 29 adapted to close and seat automatically when the piston is making an upstroke and the cushion of air is trapped within the upper portion of the casing. At the same time a ball check valve 30 acts to close an inlet port 31 formed as a feature of the upper cap 11. The port 32 guarded by the check valve 29 at its upper end is of angular form and is open at its lower end at 33 through and below the lower plate 21 of the piston. A cut-off valve 34, however, mounted for reciprocation in the lower portion of the valve stem 25 is adapted to open or close the communication through the port 32. Any suitable means may be provided to effect this cut-off movement of the valve 34 coincidentally with the reciprocation of the piston.

The means I prefer to use for the purpose of manipulating or controlling the action of the cut-off valve comprises a spring ring 35 shown in detail in Figs. 2 and 3 and in combination in Fig. 1, the same having a cylindrical portion 35$^a$ having frictional engagement with the inner wall of the cylinder 10 and a pair of inwardly projecting ears 35$^b$ arranged diametrically opposite each other on opposite sides of the plunger. 36 indicates a screw projecting through a hole 37 in one of the ears 35$^b$ and held adjustably in place therein by means of lock nuts 38. The upper end of the screw carries a head 39 fitted in a recess 40 formed in the upper surface of the lower plate 21 and wherein the head of the screw is adapted to reciprocate to limit the up and down movement of the ring 35 with respect to the piston. 41 indicates another screw fitted in a hole 42 in the opposite ear and held in adjustable position by means of lock nuts 43. The aforesaid cut-off valve 34 is secured to the upper end of this latter screw 41. The lock nuts 43 serve to determine the effective length of the screw 41 and the position of the valve 34 in the valve stem 25. A plate or similar device 44 fixed below the plate 21 serves to limit the downward movement of the valve 34 in association with the head of the screw 36 connected to the opposite side of the ring. It will be noted that the ring is split and has overlapping points at 45 so as to automatically adapt itself to the inner wall of the cylindrical casing 10. This ring, however, is not air tight in practice and is calculated only for the purpose of an actuator for the cut-off valve 34.

From the foregoing description of my device its method of operation may be briefly set forth as follows: With the parts 18 and 13 anchored to the upper and lower spring supports respectively, for example, in connection with an automobile or other vehicle, when the springs are carrying in normal or midposition the piston will occupy a position intermediate of the ends of the cylinder 10 either at the center thereof or somewhat above the center, which may be determined by the point at which the piston proper is connected to the plunger. The air entrapped in either end of the casing at such time will be at least atmospheric in pressure inasmuch as any tendency for the vacuum would be met by an inflow of air either through the port 31 or the port 27. When, however, the springs are put under compression and the plunger 17 and piston connected thereto are forced down toward the plug 12 the cushion of air entrapped within the lower end of the casing becomes proportionately compressed tending to resist the compression of the springs and acting in conjunction therewith to sustain the load resiliently. The first or initial movement of the piston downwardly will cause the automatic and immediate closing of the port 32 by means of the cut-off valve 34. This action is due to the fact that the ring 35 tends to remain at rest momentarily by frictional contact with the cylinder, and is moved up or down in the cylinder by means of the piston only after the valve 34 is first actuated. While the piston moves downward the air below the piston is prevented from escaping by means of the check valve 28. The recoil or upward tendency of the spring or the upper portion of the spring attached to the plunger 18, however, will be more effectively resisted by virtue of the pocket of air entrapped within the upper portion of the casing between the piston as it passes over the port 26, and the cap 11. All tendency of the air to escape from this pocket is resisted by the check valves 29 and 30. In other words a sharp upward impulse or bounce tending to drive the piston against the cap 11 will be resisted by a cushion of air which has no outlet, but when the vehicle approaches normal condition again the upper check valve 30 will gradually, by dropping out of sealing position, provide for equilibrium of air pressure within the upper portion of the casing. In other words throughout the operation of my improvement the condition of air pressure or cushion always automatically adjusts itself to the variable conditions of traffic. The two screws 36 and 41, by virtue of their facility for independent adjustment in effective length always insure that the actuator ring shall be hung in a plane parallel to the bottom of the piston and hence no binding or cramping thereof can result.

For the most effective cushioning operation of the piston, when the plunger is forced down relatively the valve 34 should close completely providing no exit for the air from the lower chamber. This air entrapped in the lower chamber becomes thus compressed in proportion to the load acting to force the piston down, and the expansive force of this compressed air under circumstances would add greatly to the recoil of the springs, a result that would be very uncomfortable to the passengers, if not disastrous to the mechanism. With this construction, therefore, when the piston starts back on its up-stroke, due to the recoil of the springs, the initial up-movement of the piston serves to open the valve 34 due to the drag incident to the friction ring 35. The highly compressed air spurts or passes then freely from the lower chamber into the upper chamber thereby making a denser cushion of air in the upper chamber which serves to check or cushion the recoil of the springs. In other words I provide by this mechanism for the maximum cushioning effect of each stroke of the piston, and also the relief from that upward recoil that would be incident to the dense cushion of compressed air in the lower end of the cylinder.

I claim:

1. In an automatic air cushion of the character set forth, the combination of a tubular casing, a piston adapted to reciprocate therein and including a plunger extending through one end of the casing, attachment means connected to the outer end of the plunger and opposite end of the casing, said piston being provided with a port therethrough, a cut-off valve adapted to control the flow of air through said port, and an automatic actuator device connected to said cut-off valve and bearing frictionally on the wall of the casing to control the movement thereof with relation to the piston as a result of the movement of the piston at the beginning of each reciprocation of the piston.

2. In an automatic air cushion device, the combination of a tubular casing, a piston adapted to reciprocate therein, a plunger connected to the piston and projecting from one end of the casing and having an attachment device at its outer end, an attachment device for the opposite end of the casing, said piston having an air port leading therethrough at one side of the plunger, a reciprocating cut-off valve coöperating with said port to control the passage of air therethrough, and an actuator ring connected to the piston and said cut-off valve and adapted for a limited amount of independent movement with respect to the piston, said ring having frictional contact with the inner wall of the casing.

3. In an automatic air cushion device, the combination of a casing, a piston slidable within the casing, a plunger connected to the piston and extending beyond one end of the casing, said piston comprising a packing device having airtight contact with the inner wall of the casing, a pair of rigid plates above and below said packing device, means to lock the plates and device between them to the plunger, one of the plates having a valve stem extending therefrom through the packing device and through the other plate, movable valve means within the valve stem, and means connected to the valve means to cause the automatic actuation thereof as a result of the reciprocation of the piston within the casing.

4. The herein described automatic air cushion device comprising the combination of a casing having means to admit air into the upper and lower portions thereof and having a breathing port intermediate of its ends, means to prevent the outflow of air from either end of the casing when the air entrapped therein is put under compression, a piston slidable within the casing and having an air port extending therethrough from one end of the casing to the other, a valve movable with respect to the piston and acting to control the passage of air from said passageway through the piston, and an actuator device connected to the valve and serving by means of frictional contact with the casing to open the valve when the piston moves in one direction and to move the valve relatively in the opposite direction when the piston starts to move in the opposite direction.

5. In a device of the character set forth, the combination of a cylinder, a piston reciprocating therein, means to operate the piston with relation to the cylinder, said piston having a passageway therethrough, a movable valve to control the extent of opening of the passageway, and an actuator means connected to the valve and having frictional engagement with the cylinder whereby the initial movement of the piston in either direction is independent of the movement of the actuator means and causes thereby a movement of the piston with respect to the valve.

6. The combination with a casing having a closed end and a piston reciprocating within the casing and serving to cause a cushion of dense highly compressed air in the closed end of the casing while making a reciprocation toward such end, said piston being provided with a port serving to admit air into the space between the piston and said closed end when the piston makes a reciprocation in the opposite direction, of means associated with the piston serving to automatically transfer the highly compressed air aforesaid to the space on the opposite side of the piston at the instant the piston starts to make said reciprocation in the other direction.

GEORGE WILLIAM MacKINNON.